United States Patent [19]

Mullins et al.

[11] Patent Number: 5,284,921
[45] Date of Patent: Feb. 8, 1994

[54] PREPARATION OF POLY(ARYLETHER/THIOETHER) SEGMENTED BLOCK COPOLYMERS

[75] Inventors: Michael J. Mullins; Edmund P. Woo, both of Midland, Mich.

[73] Assignee: The Dow Chemical Company, Midland, Mich.

[21] Appl. No.: 970,523

[22] Filed: Nov. 2, 1992

Related U.S. Application Data

[63] Continuation of Ser. No. 713,539, Jun. 6, 1991, abandoned, which is a continuation of Ser. No. 248,080, Sep. 23, 1988, abandoned.

[51] Int. Cl.$^5$ .................... C08L 71/12; C08L 81/02
[52] U.S. Cl. .................... 525/390; 525/469; 525/397
[58] Field of Search ................ 525/469, 390, 397

[56] References Cited

U.S. PATENT DOCUMENTS

| | | | |
|---|---|---|---|
| 4,186,262 | 1/1980 | Freeman et al. | |
| 4,636,557 | 1/1987 | Deckers | |
| 4,668,744 | 5/1987 | Matzner | 525/397 |
| 4,837,284 | 6/1989 | Matzner | 525/437 |
| 4,880,884 | 11/1989 | Mullins | 525/469 |

FOREIGN PATENT DOCUMENTS

| | | |
|---|---|---|
| 0194062 | 9/1986 | European Pat. Off. |
| 3602090 | 1/1986 | Fed. Rep. of Germany |
| 30527 | 2/1988 | Japan |

OTHER PUBLICATIONS

Synthesis and Characterization of Poly (Aryl Ether Ketone Sulfone) Copolymers, Wu, et al., *J. Am. Chem. Soc. Polymer Prep.* 26(2) (1985), p. 277.

Synthesis and Properties of Polyaryletherketones, Attwood et al., *Polymer* vol. 22, p. 1096 (1981).

*Primary Examiner*—James J. Seidleck
*Assistant Examiner*—I. Zemel

[57] ABSTRACT

Block copolymers comprising activated aromatic ether or thioether repeat units having utility as molding resins are prepared by contacting polymers comprising different activated aromatic ether or thioether repeat units in the presence of an exchange catalyst.

17 Claims, No Drawings

PREPARATION OF POLY(ARYLETHER/THIOETHER) SEGMENTED BLOCK COPOLYMERS

This is a continuation of application Ser. No. 07/713,539, filed Jun. 6, 1991 now abandoned, which is a continuation of application Ser. No. 07/248,080, filed Sep. 23, 1988 now abandoned.

BACKGROUND OF THE INVENTION

This invention relates to polyether copolymers. More particularly, the invention relates to poly(aryl ether/thioether) segmented block copolymers and to the preparation of such segmented block copolymers.

Poly(aryl ethers/thioethers) are well-known resinous materials for which there are numerous commercial applications. They have good thermal and mechanical characteristics, and exhibit a wide range of other physical properties. Poly(aryl ethers/thioethers) may be categorized as amorphous or crystalline. The crystalline polymers are exceptionally chemically resistant, costly, generally insoluble in common organic solvents, and have generally low glass transition temperatures which limits their use temperatures. By contrast, the commercially available amorphous poly(aryl ether/thioethers) generally have higher glass transition temperatures and are less costly, but are also less resistant to organic solvents.

Attempts to modify the properties of poly(aryl ether/thioether) resins by blending with other polymeric materials are quite often unsatisfactory because of the incompatibility of the poly(aryl ether/thioethers) with other resinous materials. To overcome this problem, it has been proposed to polymerize one poly(aryl ether/thioether) with other poly(aryl ethers/thioethers) in order to produce poly(aryl ether/thioether) segmented block copolymers. For example, the desirable characteristics of poly(aryl ether ketones) and poly(aryl ether sulfones), e.g., solvent resistance and high glass transition temperature ($T_g$), may be achieved by preparing a poly(aryl ether) segmented block copolymer containing both chemical groups.

Methods for preparing random poly(aryl ether) copolymers are known. Poly(ether ketone) and poly(ether sulfone) have been copolymerized by a displacement reaction, utilizing a diaryl sulfone solvent, as disclosed in "Synthesis and Properties of Polyaryletherketones", T. E. Attwood, et al., Polymer, 22, 1096 (1981). However, attempts to prepare block copolymers were unsuccessful. In "Synthesis and Characterization of Poly-(Arylene Ether Ketone Sulfone) Copolymers", S. D. Wu, et al., J. Am. Chem. Soc. Polymer Prep. 227, Vol (26)2 (1985), two processes were disclosed. The first combined poly(aryl sulfone) oligomers with difluorobenzophenone monomers in an N-methyl-2-pyrrolidinone solvent, to prepare a poly(aryl ether ketone sulfone) alternating copolymer. The article described this process as simple "chain extension". The poly(aryl sulfone) oligomers were subject to ether exchange, resulting in randomization of the copolymer. The second process produced alternating copolymers from difluorobenzophenone and chlorophenylsulfone monomers, reacted together in a diphenyl sulfone solvent. Likewise, ether interchange promoted randomization of the copolymer.

SUMMARY OF THE INVENTION

The present invention is directed toward a novel class of poly(aryl ether/thioether) segmented block copolymers, and their preparation. The poly(aryl ether/thioether) segmented block copolymers of the present invention are surprisingly prepared by:

contacting at least one activated poly(aryl ether/thioether) polymer, corresponding to the formula:

wherein A is an activated aromatic radical having at least one electron-withdrawing group located in a position ortho or para to its ether/thioether linking group, O' is oxygen or sulfur in the case of a thioether, and n represents the number of repeated activated aryl ether/thioether units, with at least one activated poly(aryl ether/thioether) polymer corresponding to the formula:

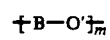

wherein B is an activated aromatic radical, different from the A radical, having at least one electron-withdrawing group located in a position ortho or para to its ether/thioether linking group, O' is oxygen or sulfur in the case of a thioether, and m represents the number of repeated activated aryl ether/thioether units, in the presence of an effective amount of at least one exchange catalyst, at an elevated temperature and for a time, sufficient to prepare a poly(aryl ether/thioether) segmented block copolymer corresponding to the formula:

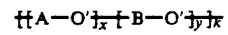

wherein A, B, and O' are as previously defined, x represents the number of repeated activated aryl ether/thioether units containing the A radical, y represents the number of repeated activated aryl ether/thioether units containing the B radical, and k represents the overall degree of polymerization.

The subscripts x and y, representing the numbers of repeated active aryl ether/thioether units, are each independently conveniently in the range of about 30 to about 200. However, it must be understood that the exchange reaction, by which the poly(aryl ether/thioether) segmented block copolymers are prepared, may be employed to prepare block copolymers in which x and y are each independently in the range of about 2 to about 10,000.

As indicated above, the poly(aryl ether/thioether) segmented block copolymers of the present invention may alternatively be prepared using either poly(aryl ether) polymers or poly(aryl thioether) polymers or mixtures of each. A thioether is understood to mean an ether compound wherein a sulfur atom is substituted for the normally present ether oxygen atom.

A and B are desirably $C_6$–$C_{30}$ aromatic radicals, which optionally may contain one or more substituent monovalent $C_1$–$C_{20}$ aliphatic radicals, halo radicals, alkoxy radicals, aryloxy radicals, thioalkoxy radicals or thioaryloxy radicals, or divalent $C_1$–$C_{20}$ aliphatic radicals, alkoxy radicals, aryloxy radicals, thioalkoxy radicals or thioaryloxy radicals. A and B are different radicals. By different is meant dissimilar in any respect, such as for example, structurally, chemically or sterically.

The poly(aryl ether/thioether) segmented block copolymers prepared according to the present invention exhibit high temperature dimensional stability and excellent thermoplastic engineering properties, as well as superior solvent resistance when prepared in crystalline form, making them particularly suitable for producing molded plastic components.

DETAILED DESCRIPTION

Accordant with the present invention, poly(aryl ether/thioether) segmented block copolymers are prepared by reacting together "activated" poly(aryl ether/thioether) polymers to form a segmented block copolymer, represented by the formula:

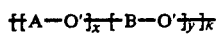

wherein A, B, O', x, y and k are as previously defined.

The term activated, as used herein, means that the particular aryl compound contains at least one electron-withdrawing substituent at a position ortho or para to its ether/thioether linking group.

Suitably any activated poly(aryl ether/thioether) polymer may be employed in the present invention, providing that it contains at least one electron-withdrawing substituent at a position ortho or para (preferably para) to its ether/thioether linking group. Poly(aryl ether/thioether) polymers employed in the present invention may be prepared by the polycondensation of an aromatic acid in the presence of a boron trifluoride-hydrogen fluoride catalyst. See U.S. Pat. No. 3,442,857, which is incorporated herein by reference.

Alternatively, poly(aryl ether/thioether) polymers employed in the present invention may be prepared by the polycondensation of the anhydrous alkali metal salt of an aryl fluoride in the presence of diphenyl sulphone solvent, as disclosed in Attwood et al., Polymer, vol. 22, p. 1096 (1981).

Additional methods for preparing poly(aryl ethers/thioethers) are disclosed in British Patents Nos. 971,227, 1,177,183 and 1,387,303, and in U.S. Pat. No. 4,175,175, which are incorporated herein by reference thereto.

Poly(aryl ether/thioether) segmented block copolymers may be prepared from mer units, containing properly positioned electron-withdrawing groups, such as for example:

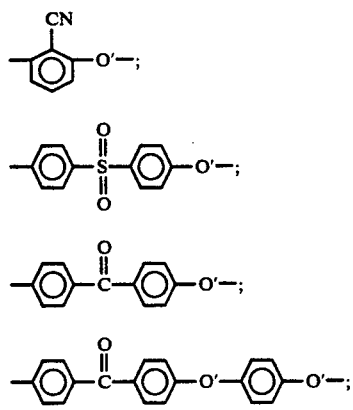

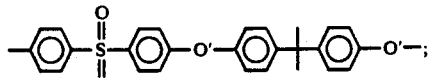

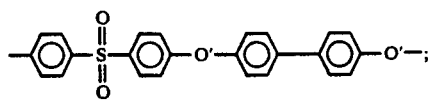

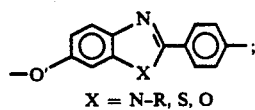

X = N-R, S, O

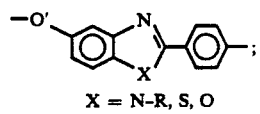

X = N-R, S, O

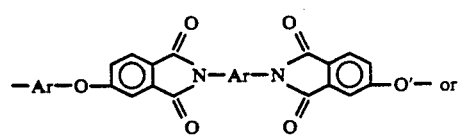 or

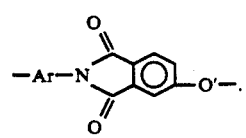

Ar each, independently = m-phenylene,
p-phenylene,
$pC_6H_4C(CH_3)_2pC_6H_4$, $pC_6H_4OpC_6H_4$,
$pC_6H_4SpC_6H_4$, $pC_6H_4CH_2pC_6H_4$, $pC_6H_4C_6H_4$,
or $pC_6H_4SO_2pC_6H_4$.

Suitable electron-withdrawing groups may be, without limitation to those specifically recited, divalent groups at the para position such as for example —CO—, —CONH—, —SO—, —SO$_2$—, —$^+$NR$_2$—, —$^+$PR$_2$—, —$^+$SR—, —P(O)R—, —C(CF$_3$)$_2$—, —CH=CH—, —NN—, —CHNNCH—, imidazolenyl, oxazolenyl, pyrazolenyl, isoxazolenyl, oxypyrazolenyl, benzoquinonenyl, benzoxazolenyl and benzothiazolenyl, or monovalent groups at the ortho position such as for example —CN, —NO$_2$, —CHO, —CO$_2$R, —CO$_2$NH$_2$, —P(O)(OR)$_2$, —P(O)R, —CF$_3$, —$^+$PR$_3$, —$^+$NR$_3$ and —$^+$SR$_2$, wherein R is independently each occurrence a $C_1$—$C_{12}$ alkyl radical.

Preferred activated poly(aryl ether/thioether) polymers employed in the present invention are poly(ether sulfone) and poly(ether ether ketone).

An exchange catalyst suitable for use in the present invention is represented by the formula:

$$M_pZ_q$$

wherein M represents a monovalent or multivalent metal ion, Z is a halo, carbonate, bicarbonate, phenoxide, bisphenoxide, alkoxide, cyanide, nitrate, nitrite, hydroxide, phosphate, or aryl or alkyl carboxylate radical, and p and q are whole numbers in the range from 1 to 6 which satisfy chemical valency requirements. An effective amount of catalyst, according to the present invention, is that amount which will catalyze the reaction between poly(aryl ether/thioether) polymers to prepare a poly(aryl ether/thioether) segmented block copolymer. Preferred catalysts, according to the present invention, are cesium fluoride, cesium carbonate and cesium phenoxide. A most preferred catalyst is cesium phenoxide.

The segmented block copolymerization of the present invention is carried out by blending poly(aryl ether/thioether) homopolymers, at a temperature at least as high as the highest of the glass transition temperatures of the oligomers, in the presence of an exchange catalyst, and optionally in the presence of a solvent. High boiling point solvents, such as for example, diphenyl sulfone or benzophenone are preferred. Copolymerization is allowed to proceed until the desired block segment lengths are achieved, as determined by experimentation, at which time the reaction is terminated. The reaction is typically effected at temperatures in the range from about 150° C. to about 400° C., depending upon the glass transition temperatures of the oligomers; preferably the range is from about 250° C. to about 350° C.; most preferably, the effective temperature range is from about 280° C. to about 320° C. The catalyst is preferably employed in an amount in the range from about 0.001 to about 10.0 weight percent; more preferably the range is from about 0.01 to about 2.0 weight percent; most preferably, the effective range is from about 0.1 to about 0.5 weight percent.

The segmented block copolymers of the present invention may be prepared by contacting, under poly(aryl ether/thioether) segmented block copolymer forming conditions, varying quantities of activated poly(aryl ether/thioether) polymers, wherein the ratio of polymer having aromatic groups represented by A, to polymer having aromatic groups represented by B, i3 in the range from about 99:1 to about 1:99.

While not wishing to be bound by any particular theory regarding the copolymerization reaction of the present invention, it is believed that the probable mechanism comprises two distinct steps.

The initial step involves chain cleavage by the nucleophilic anion of an exchange catalyst salt at one of the oxygen/sulfur-carbon bonds in one of the poly(aryl ether/thioether) polymer molecules:

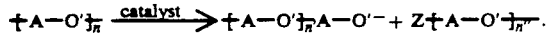

This produces two polymer fragments; a shortened neutral poly(aryl ether/thioether) polymer molecule having a catalyst salt ion terminus, and an anionic phenate terminated poly(aryl ether/thioether) polymer molecule.

In the second step, the anionic fragment produced in the first step attacks another poly(aryl ether/thioether) polymer molecule at an ether/thioether linkage:

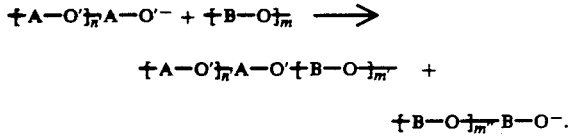

As in step one, a neutral molecule is formed as well as an anionic molecule. The neutral polymer molecule is the segmented block copolymer. The resultant anionic polymer molecule is free to attack other polymer molecules to form new polymers and new anionic molecules.

As the reaction proceeds, the concentration of polymers employed in the present invention decreases, and the concentration of segmented block copolymers increases. Also, the copolymer block segment lengths decrease with time. The relative lengths of the poly(aryl ether/thioether) block segments tend to be proportional to their respective starting polymer percentages.

There are several advantages in the preparation of the poly(aryl ether/thioether) segmented block copolymers of the present invention over the prior art. The present process may be practiced using relatively inexpensive blending equipment. The tremendous capital investment normally required to commercialize a new engineering thermoplastic is thereby circumvented. In the conventional method for the preparation of poly(aryl ether/thioether) copolymers, it is necessary to prepare each block separately before linking them in a final reaction. The present invention allows for the preparation of segmented block copolymers having various block segment lengths, depending upon the reaction conditions. This is an important advantage since copolymer properties are strongly dependent on block segment lengths. The present invention allows for the preparation of high molecular weight crystalline block copolymers.

During the reactive blending process of the present invention, the amount of poly(aryl ether/thioether) segmented block copolymer increases, and the lengths of the block segments decrease. The properties of the resultant segmented block copolymer product may be changed by modifying the reaction conditions, such as the length of time that the polymers are reacted together, the nature of the poly(aryl ether/thioether) polymers employed in the present invention, or the reaction temperature. It is known that the minimum copolymer block segment lengths required for a copolymer to exhibit single phase behavior is strongly dependent on the solubility characteristics of the blocks in the copolymer. Poly(aryl ether/thioether) polymers may be contacted under reactive conditions resulting in a product in which only about one percent of the polymers have combined to form a poly(aryl ether/thioether) segmented block copolymer.

The homogeneous poly(aryl ether/thioether) segmented block copolymers of the present invention are more easily formed into finished products than the corresponding immiscible blends of the unreacted poly(aryl ether/thioether) polymers. When molding finished products from immiscible multi-phase polymer blends, the morphology of the molded pieces will determine their structural integrity. Likewise, the heat distortion temperature of an immiscible blend will often be determined by the lowest glass transition temperature of the polymers. The single phase poly(aryl ether/thioether) segmented block copolymers obtainable by the present invention overcome the aforementioned processing difficulties, resulting in isotropic molded articles having a glass transition temperature which is intermediate, relative to the original homopolymer blend.

The procedure of blending polymers for commercial use is commonly practiced in order to improve one or more properties of one of the polymers by the addition of another. In the present invention, the properties of the homogeneous single-phase segmented block copolymer are generally intermediate between the properties of the starting polymer materials. In this fashion, improved molding compositions may be obtained at minimal additional cost.

Combinations of polymers which are miscible, and which therefore form homogeneous blends, are rare. Generally, polymer blends consist of immiscible segregated domains which suffer from poor adhesion with one another, resulting in finished molded products exhibiting poor ductility and impact resistance. The present invention may advantageously be employed to transform immiscible poly(aryl ether/thioether) polymer blends into a homogeneous block copolymer or, during the early stages of the reactive blending process, a composition comprising a compatibilizing amount of the segmented block copolymer and a residual amount of the polymers. It is known that block copolymers are often excellent compatibilizing agents for their constituent homopolymers. See Kirk-Othmer "Encyclopedia of Chemical Technology," 3rd Edition, vol. 18, p. 433 (1982).

The invention is more easily comprehended by reference to specific embodiments which are representative of the invention. It must be understood, however, that the specific embodiments are provided only for the purposes of illustration and understanding, and that the invention may be practiced otherwise than as specifically illustrated and described without departing from its scope.

EXAMPLE 1

Preparation of a 50/50 Block Copolymer From Poly(Ether Sulfone) and Poly(Ether Ether Ketone)

A mixture of 15.0 g of poly(ether sulfone) (a poly(aryl ether) having an electron-withdrawing group in the para position sold by Imperial Chemical Industries under the trade designation PES 3600G), 15.00 g of poly(ether ether ketone) (a poly (aryl ether) having an electron-withdrawing group in the para position sold by Imperial Chemical Industries under the trade designation VICTREX 380P), and 15.00 g of diphenyl sulfone was placed into a 300 mL glass resin kettle. The mixture was dried by evacuating the kettle for 1 hour at 150° C. A catalyst (257.8 mg of cesium phenoxide) was added. Oxygen was purged from the system by applying a nitrogen blanket, and the kettle immersed in a salt bath. The temperature of the stirred reaction mixture was raised from 234° C. to 335° C. over a period of 15 minutes, and maintained at the higher temperature for an additional 196 minutes. The resultant solidified mixture was broken into pieces and placed in a Soltex extractor having a methylene chloride reflux for 24 hours. Methylene chloride was evaporated from the mixture, and diphenyl 3ulfone was removed using bulb-to-bulb distillation at 200° C. and 0.2 mm Hg. The undistilled residue weighed 1.98 g, thereby indicating that the poly(ether sulfone) had been incorporated into a methylene chloride-insoluble poly(ether sulfone)-poly(ether ether ketone) copolymer. The methylene chloride-insoluble portion from the Soltex extractor was dried overnight in a vacuum oven maintained at 140° C., resulting in 28.04 g of the segmented block copolymer having an inherent viscosity of 0.74 dL/g in $H_2SO_4$ at 25° C. Differential scanning calorimetry indicated two $T_g$'s at 160° C. and 225° C., and a melting endotherm at 338° C. This data indicates that the block segment lengths were sufficiently long so as to cause the copolymer to exhibit thermal behavior similar to that of the homopolymers.

EXAMPLE 2

Preparation of a 50/50 Random Copolymer From Poly(Ether Sulfone) and Poly(Ether Ether Ketone)

The exchange reaction of Example 1 was repeated, excepting that a greater quantity of catalyst was employed, and the reaction time was extended, in order to prepare a copolymer approaching a random configuration. A mixture of 10.00 g of the poly(ether sulfone), 10.00 g of the poly (ether ether ketone), 10.00 g of diphenyl sulfone, and 518.7 g of cesium phenoxide was used. The exchange reaction proceeded at 330° C. for 255 minutes. The copolymer yield was 17.61 g, and exhibited an inherent viscosity of 0.59 dL/g in $H_2SO_4$ at 25° C. Differential scanning calorimetry indicated a single $T_g$ at 182° C., and no crystallization endotherm.

COMPARISON 3

Preparation of a 50/50 Blend Poly(Ether Sulfone) and Poly(Ether Ether Ketone)

In order to demonstrate that the polymers prepared in Examples 1 and 2 were copolymers and not blends, the procedure described in Example 1 was repeated, excepting that a catalyst was not used. A mixture of 15.00 g of the poly(ether sulfone), 10.00 g of the poly(ether ether ketone) and 20.00 g of diphenyl sulfone was prepared. The stirred mixture was heated from 300° C. to 330° C. over a 10 minute period, then maintained at the higher temperature for 170 minutes. After workup as in Example 1, 15.61 g of material was extracted by methylene chloride, while 9.03 g of the poly(ether ether ketone) remained undissolved. The poly(ether sulfone) was extractable by methylene chloride because it had not been covalently bound to the poly(ether ether ketone).

EXAMPLE 4

Preparation of a 50/50 Block Copolymer from Poly(Ether Imide) and Poly(Ether Ether Ketone)

A mixture of 15.00 g of a poly(ether imide) (a poly(aryl ether) having an electron-withdrawing group in the para position sold by General Electric under the trade designation ULTEM 1000), 15.00 g of poly(ether ether ketone) (sold by imperial Chemical Industries under the trade designation VICTREX 380P), and 15.00 g of diphenyl sulfone was placed in a 300 mL glass resin kettle. The mixture was dried by evacuating the kettle for 1.5 hours at 150° C. A catalyst (72.1 mg of cesium phenoxide) was added. Oxygen was purged from the system by applying a nitrogen blanket, and the kettle immersed in a salt bath. The temperature of the stirred reaction mixture was raised from 316° C. to 335° C. over a period of 15 minutes, and maintained at the higher temperature for an additional 2.5 hours. The resultant solidified mixture was broken into pieces and placed in a Soltex extractor having a methylene chloride reflux for 24 hours. Methylene chloride was evaporated from the mixture, and diphenyl sulfone was removed using bulb-to-bulb distillation at 200° C. and 0.2 mm Hg. The undistilled residue weighed 1.40 g, thereby indicating that the poly(ether imide) had been incorporated into a methylene chloride-insoluble poly(ether imide)-poly(ether ether ketone) copolymer. The methylene chloride-insoluble portion from the Soltex extractor was dried overnight in a vacuum oven maintained at 140° C., resulting in 31.04 g of the segmented block copolymer.

EXAMPLE 5

Preparation of a 50/50 Block Copolymer From Poly(Ether Imide) and Poly(Ether Ether Ketone)

A mixture of 10.00 g of a poly(ether imide) (sold by General Electric under the trade designation ULTEM 1000), 15.00 g of poly(ether ether ketone) sold by Imperial Chemical Industries under the trade designation VICTREX 380P), and 10.00 g of diphenyl sulfone was placed in a 300 mL glass resin kettle. The mixture was dried by evacuating the kettle for 1 hour at 100° C. A catalyst (174.1 mg of cesium phenoxide) was added. Oxygen was purged from the system by applying a nitrogen blanket, and the kettle immersed in a salt bath. The temperature of the stirred reaction mixture was raised from 170° C. to 340° C. over a period of 60 minutes, and maintained at the higher temperature for an additional 15 minutes. The resultant solidified mixture was broken into pieces and placed in a Soxlet extractor having a methylene chloride reflux for 24 hours. Methylene chloride was evaporated from the mixture, and diphenyl sulfone was removed using bulb-to-bulb distillation at 200° C. and 0.2 mm Hg. The methylene chloride-insoluble portion from the Soxlet extractor was dried overnight in a vacuum oven maintained at 140° C., resulting in 20.48 g of the segmented block copolymer.

COMPARISON 6

Preparation of a 50/50 Blend From Poly(Ether Imide) and Poly(Ether Ether Ketone)

In order to demonstrate that the polymers prepared in Examples 4 and 5 were copolymers and not blends, the procedure described in Example 4 was repeated, excepting that a catalyst was not used. A mixture of 15.00 g of the poly(ether imide), 5.00 g of the poly(ether ether ketone), and 20.00 g of diphenyl sulfone was prepared. The stirred mixture was heated from 250° C. to 328° C. over a 28 minute period, then maintained at approximately 320° C. for 1 hour. After workup as in Example 4, 99% of the poly(ether imide) was extracted with methylene chloride.

What is claimed is:

1. A process for the preparation of block copolymers comprising repeat units of the formula:

wherein A and B are different activated aromatic radicals having at least one electron withdrawing group located in a position ortho or para to O', and O' is oxygen or sulfur, the steps of the process comprising contacting at least one polymer comprising repeat units corresponding to the formula:

with at least one polymer comprising repeat units corresponding to the formula:

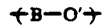

wherein A, B, and O' are as previously defined, in the presence of an effective amount of at least one exchange catalyst, at an elevated temperature and for a time, sufficient to prepare the block copolymer by an exchange reaction.

2. The process according to claim 1, wherein the catalyst corresponds to the formula:

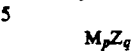

wherein M represents a monovalent or multivalent metal ion, Z is a halo, carbonate, bicarbonate, phenoxide, bisphenoxide, alkoxide, cyanide, nitrate, nitrite, hydroxide, phosphate, or aryl or alkyl carboxylate ion, and p and q are each independently whole numbers in the range from 1 to 6 which satisfy chemical valency requirements.

3. The process according to claim 2, wherein the catalyst is selected from the group consisting of cesium fluoride, cesium carbonate and ceium phenoxide.

4. The process according to claim 1, wherein A and B are different divalent $C_6$–$C_{30}$ aromatic radicals.

5. The process according to claim 4, wherein the aromatic radicals contain monovalent substituents selected from the group consisting of halo, $C_1$–$C_{20}$ aliphatic, alkoxy and aryloxy radicals.

6. The process according to claim 1, wherein the electron-withdrawing groups are each independently divalent radicals in the para position selected from the group consisting of —CO—, —COHN—SO—, —SO$_2$—, —$^+$NR$_2$—, —$^+$PR$_2$—, —$^+$SR—, —P(O)R—, —(CF$_3$)$_2$—, —CH=CH—, —NN—, —CHNNCH—, imidazolenyl, oxazolenyl, pyrazolenyl, isoxazolenyl, oxopyrazolenyl, benzoquinonenyl, benzoxazolenyl, and benzothiazolenyl, or monovalent radicals in the ortho position selected from the group consisting of —CN, —NO$_2$, —CHO, —CO$_2$R, —CO$_2$NH$_2$, —P(O)(OR)$_2$, —P(O)R, —CF$_3$, —$^+$PR$_3$, —$^+$NR$_3$, and —$^+$SR$_2$, wherein R is a $C_1$–$C_{12}$ alkyl radical. and benzothiazolenyl, or monovalent radicals in the ortho position selected from the group consisting of —CN, —NO$_2$, —CHO, —CO$_2$R, —CO$_2$NH$_2$, —P(O)(OR)$_2$, —P(O)R, —CF$_3$, —$^+$PR$_3$, —$^+$NR$_3$, and —$^+$SR$_2$, wherein R is a $C_1$–$C_{12}$ alkyl radical.

7. The process according to claim 1, wherein the contacting is carried out in the presence of a solvent.

8. The process according to claim 7, wherein the solvent is selected from the group consisting of diphenyl sulfone and benzophenone.

9. The process according to claim 3, wherein the catalyst is present in an amount from about 0.001 to about 10.0 weight percent relative to the total weight of polymers.

10. The process according to claim 9, wherein the catalyst is present in an amount from about 0.01 to about 2.0 weight percent relative to the total weight of polymers.

11. The process according to claim 8, wherein the solvent is present in an amount from about 0.1 to about 1,000.0 weight percent relative to the total weight of polymers.

12. The process according to claim 11, wherein the solvent is present in an amount from about 0.1 to about 200.0 weight percent relative to the total weight of polymers.

13. The process according to claim 1, wherein the temperature during contacting is from about 150° C. to about 400° C.

14. The process according to claim 1, wherein the catalyst corresponds to the formula:

$$M_p Z_q$$

wherein M represents a monovalent or multivalent metal ion, Z is a halo, phenoxide, bisphenoxide, alkoxide, cyanide, nitrate, nitrite, hydroxide, phosphate, or aryl or alkyl carboxylate ion, and p and q are each independently whole numbers in the range from 1 to 6 which satisfy chemical valency requirements.

15. The process according to claim 14, wherein the catalyst is selected from the group consisting of cesium fluoride and cesium phenoxide.

16. The process according to claim 15, wherein the catalyst is present in an amount from about 0.01 to about 1.0 weight percent relative to the total weight of polymers.

17. The process of claim 1, wherein one contacted polymer is an aromatic poly(aryl ether sulfone) and one contacted polymer is an aromatic poly(aryl ether ether ketone).

* * * * *

UNITED STATES PATENT AND TRADEMARK OFFICE
CERTIFICATE OF CORRECTION

PATENT NO. : 5,284,921
DATED : February 8, 1994
INVENTOR(S) : Michael J. Mullins; Edmund P. Woo It is certified that error appears in the above-identified patent and that said Letters Patent is hereby corrected as shown below:

Col. 10, line 17, "ceium" should read -- cesium --.

Col. 10, line, line 27, "-COHN-" should read -- -CONH- --.

Col. 10, lines 36 through 41 delete "and benzothiazolenyl, or monovalent radicals in the ortho position selected from the group consisting of -CN, -NO$_2$, -CHO, -CO$_2$R, -CO$_2$NH$_2$, -P(O)(OR)$_2$, -P(O)R, -CF$_3$, -+PR$_3$, -+NR$_3$, and -+SR$_2$, wherein R is a C$_1$-C$_{12}$ alkyl radical.

Signed and Sealed this

Eighteenth Day of October, 1994

Attest:

BRUCE LEHMAN

*Attesting Officer*    *Commissioner of Patents and Trademarks*